May 10, 1927.
S. KRALL
1,627,785
METHOD OF VULCANIZING TIRES
Filed Aug. 30, 1926
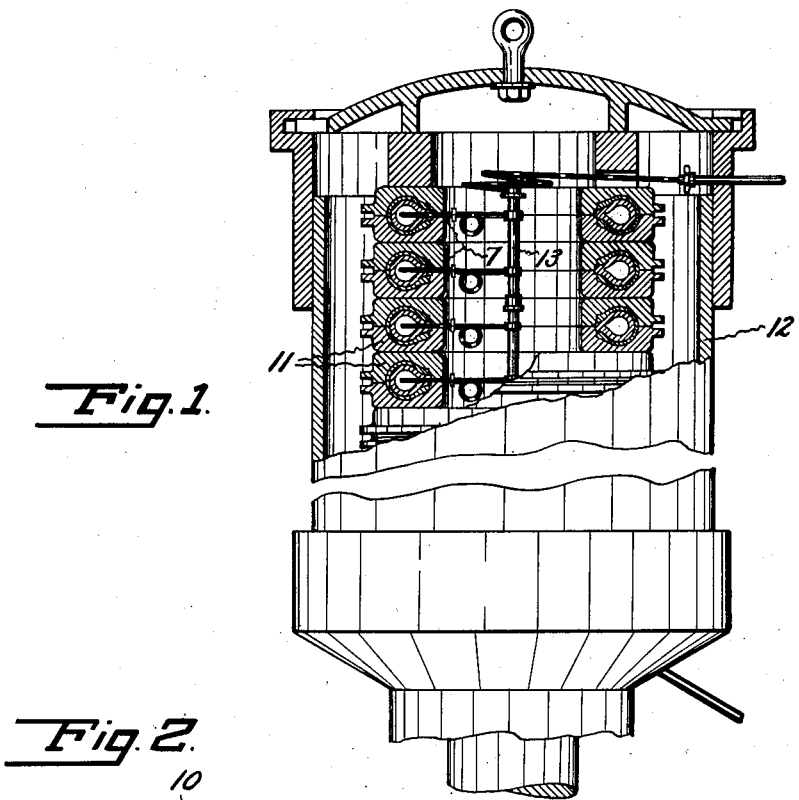
Fig.1.
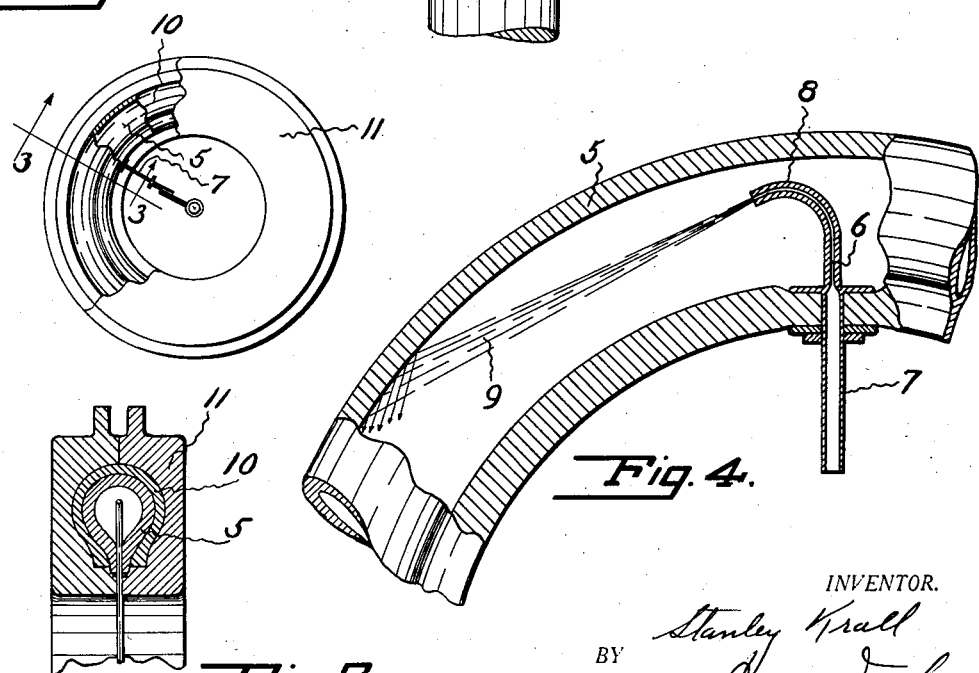
Fig.2.
Fig.3.
Fig.4.
INVENTOR.
Stanley Krall
BY
Edward C. Taylor
ATTORNEY.

Patented May 10, 1927.

1,627,785

UNITED STATES PATENT OFFICE.

STANLEY KRALL, OF LONGMEADOW, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF VULCANIZING TIRES.

Application filed August 30, 1926. Serial No. 132,398.

This invention relates to an improved method of vulcanizing pneumatic tires. It has for its object the reduction in the time necessary for vulcanization and as a consequence an increase in the output of a given amount of vulcanizing equipment. It has for a further object the improvement in the evenness of the cure given to the tire both with respect to points on the inside and the outside of the tire and with respect to different portions of the tire. It has for a still further object the improvement of apparatus for vulcanizing tire casings in the point of simplicity of construction and operation.

Referring to the drawings,

Fig. 1 is a side elevation, partly in section, of a vulcanizing heater showing a stack of molds therein fitted for the performance of the process forming my invention;

Fig. 2 is a top plan view of a mold broken away to show the tire and internal pressure bag located therein;

Fig. 3 is a detail of a nozzle employed in the pressure bag; and

Fig. 4 is a section of a pressure bag showing the manner of operation of the steam-admitting nozzle.

The problem to which my invention furnishes a solution is the securing of even vulcanization of a tire casing in the shortest possible time. The customary method of vulcanizing present day cord tires is to mount them upon an internal pressure bag made in endless annular form, to locate the tire and the bag in a mold, and to vulcanize the tire by heat supplied through the mold while the tire is expanded outwardly into the mold by air pressure applied to the inside of the annular bag. Since the heat is supplied only from the outside of the casing, the outer layers tend to heat up faster than the inner layers and therefore vulcanize to a greater degree. Varying the content of accelerator in the several layers compensates somewhat for this condition, since the greater the amount of the accelerator, the faster the cure. By adjusting the accelerator in the various layers of the casing, or by otherwise changing the compound, the inner layers can be caused to vulcanize satisfactorily, from a service standpoint, in the same time as the outer layers when the varying conditions of heat occurring in this form of cure are taken into account. However, the cure thruout the tire is not, by this old method, as uniform as desired.

In order to hasten the cure and to make a more uniform condition throughout the thickness of the tire, it has been proposed to heat the tire both through the mold and through the pressure bag. According to these prior proposals the bag was furnished with separate inlet and outlet openings, the inlet being connected through a supply of steam and the outlet either to a discharge point or leading directly into the heater. If the form of prior device using separate inlet and outlet is used, the outlet connection is added to the one already necessary to be made when each bag is put into the heater. If the form of device having an outlet leading directly into the heater is used, it is necessary in order to effect economy in steam that the outlet be very small but in devices of this character difficulty is experienced in the small aperture plugging with impurities in the water.

I have found that pneumatic tire casings can be vulcanized with heat supplied both to the outside and to the inside by means of air bags to which steam is supplied through a single nozzle. In order to accomplish this desirable result the procedure outlined below must be followed in substance. According to this procedure I use a bag 5 having a single aperture 6 provided by a valve-stem 7 bent at its inner end 8 so that the jet of steam 9 introduced is directed tangentially around the bag. Preferably this valve-stem has an aperture 6 of approximately one-eighth of an inch. The bag 5 is placed within the tire 10 to be vulcanized and the latter inserted within the usual vulcanizing mold 11. If, as is usually desired, the tires are to be cured in a heater 12 of the so-called pot type, the molds 11 are stacked one upon another on the ram of the press. As the molds are so stacked the valve-stems 7 of the several bags 5 are united together by a stack or pipe 13 which, in order to avoid too great loss of pressure, is preferably made of about one-half inch inside diameter.

Assuming that the molds enclosing the tires and bags are properly stacked in the heater and that the heater is closed, steam under pressure, conveniently at 125 lbs. per square inch, is led into the stack supplying the inside of the bag. This steam is left on for from between five to eight minutes, depending upon the difficulty of molding the particular tire in question. After the pressure due to this internal steam has been built up sufficiently, steam is turned into the inside of the vulcanizing heater so that it surrounds the mold. This steam which is applied to the heater is preferably at a lower temperature than the steam which is applied to the inside of the pressure bag. In the practical operation of this process, I have found that satisfactory results can be obtained by raising this heater steam to 310° F. in a period of fifteen minutes, and holding it at this temperature for twenty minutes while the pressure of steam is maintained in the bag. At the end of this time the internal and external supplies of steam are turned off simultaneously giving a total time for the cure of forty minutes as compared with seventy-five minutes on the usual manner of vulcanizing tires of this type. The saving of time due to my invention amounts to forty-seven percent in the example given.

While I do not wish to be limited to the following theory, I believe that the fundamental reason for the success of my process lies in the fact that there is a constant absorption of heat by the bag, due both to the amount of heat necessary to warm up the bag and tire and to the fact that in the practice of my invention the temperature of the outside of the tire is never allowed to become as high as the temperature of the inside. The constant flow of heat from the bag into the casing results in a constant condensation of steam within the pressure bag. This constant condensation causes the flow of steam through the valve-stem to be maintained, and the small size of the aperture in the nozzle causes the velocity of the steam-flow to be kept up. At the start of the cure the tangential direction of the steam-flow into the bag of course causes a rapid whirling or circumferential flow of the steam around the bag. If the bag heated up quickly, so that it were the same in temperature as the incoming steam, the flow of steam would cease and pockets of water would accumulate in the bag. By keeping the temperature of the outside of the tire always below that of the steam in the inside, and using a small enough hole in the nozzle, constant condensation, and a constant flow and circulation of steam, results. Constant circulation prevents the formation of water pockets in the bag, with a consequent elimination of the non-uniformity of cure which these pockets would cause.

Having thus described my invention, I claim:

1. A process of vulcanizing a pneumatic tire which comprises locating the tire in a mold, placing within the tire an annular hollow pressure bag formed with a single valve-stem having its inner end tangentially directed and provided with a restricted opening, subjecting the outside of the mold to heat, and admitting to the inside of the bag steam at a pressure corresponding to a temperature greater than that to which the exterior of the mold is heated.

2. A process of vulcanizing a molded pneumatic tire which comprises heating the outside of the tire, expanding the tire into the mold and simultaneously heating it by injecting a jet of steam tangentially into a closed space within the tire and maintaining the circulation of steam and condensed water within the tire by maintaining the temperature of the steam entering within the tire higher than the temperature to which the outside of the tire is heated, thereby keeping up a condensation of steam within the tire and a consequent continuing flow of steam in the jet.

3. A process of vulcanizing a molded pneumatic tire which comprises admitting a jet of steam tangentially into a closed space within the tire until an expanding pressure is built up therein, then heating the outside of the tire to a temperature less than the temperature of the steam admitted to the space within the tire, and continuing the application of heat to the inside and a less heat to the outside of the tire until vulcanization has been completed.

STANLEY KRALL.